H. W. FLOYD.
HORSE RELEASER.
APPLICATION FILED APR. 25, 1911.
1,005,631.
Patented Oct. 10, 1911.
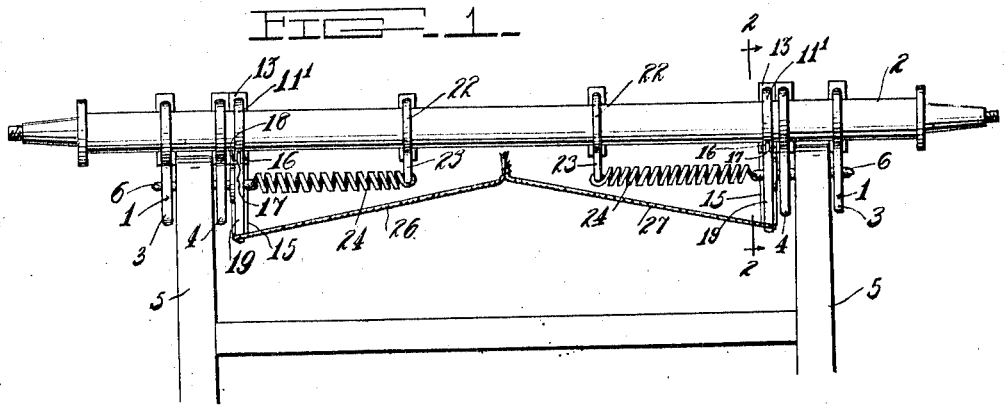
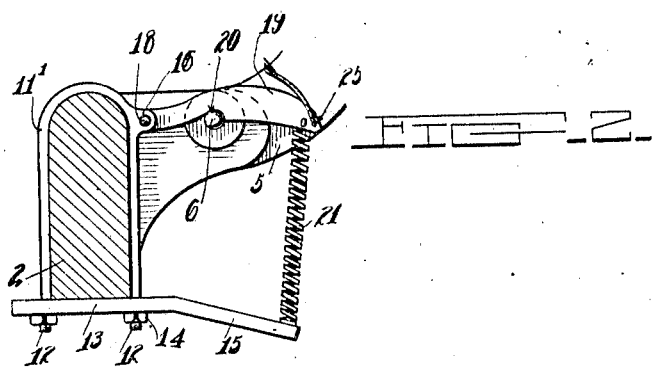
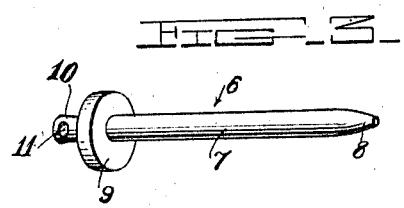
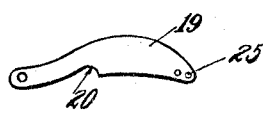
Witnesses
Inventor
H. W. Floyd.
By
Attorneys

UNITED STATES PATENT OFFICE.

HARRY W. FLOYD, OF BEEVILLE, TEXAS, ASSIGNOR OF ONE-HALF TO RUFUS O. TAYLOR, OF BEEVILLE, TEXAS.

HORSE-RELEASER.

1,005,631.  Specification of Letters Patent.  Patented Oct. 10, 1911.

Application filed April 25, 1911. Serial No. 623,291.

*To all whom it may concern:*

Be it known that I, HARRY W. FLOYD, a citizen of the United States, residing at Beeville, in the county of Bee, State of Texas, have invented certain new and useful Improvements in Horse-Releasers; and I do hereby declare the following to be a full, clear, and exact description of the invention, such as will enable others skilled in the art to which it appertains to make and use the same.

My invention relates to new and useful improvements in thill couplings and more especially to that class of thill couplings by means of which the shafts are attached to the axle in such a manner as to render the same operative as a horse detacher, and the object of my invention is to improve the construction and increase the efficiency of a device of the above described character.

A still further object of my invention is to provide a release for the coupling adapted to be actuated by springs and provided with a catch for normally holding the coupling together, by which means the driver need only release the catch, when the device will operate of itself to release the coupling.

With these and other objects in view, my invention will be more fully described, illustrated in the accompanying drawings and then specifically pointed out in the claim which is attached to and forms a part of this application.

In the drawings which illustrate a preferred embodiment of my device, Figure 1 is a plan view of the forward portion of the running gear of a wagon showing the shafts secured thereto by means of my improved coupler. Fig. 2 is a side elevation of the coupler, the axle being shown in section upon the line 2—2 of Fig. 1. Fig. 3 is a detail perspective of the coupling bolt used. Fig. 4 is a side elevation of the catch removed from the axle.

Referring more specifically to the drawings, in which similar reference numerals designate corresponding parts throughout, 1 designates in general a thill coupler of the ordinary construction and 2 the axle upon which the thill coupler is secured. The thill coupler is provided with the forwardly extending, spaced apart, apertured ears 3 and 4 adapted to fit upon either side of the shaft or thill iron 5 which is secured therebetween by means of the bolt 6 which is passed through the apertures of the thill coupler and through a similar aperture formed in the thill iron.

As will be seen by referring to Fig. 3 of the drawings this bolt is not of the ordinary construction, but consists of the cylindrical shank portion 7 slightly pointed at one end as at 8 and provided adjacent its other end with the annular flange as shown at 9. The end of the bolt adjacent this shoulder is slightly enlarged as at 10 to form a head portion, which head portion is provided with an aperture 11.

While I have described but one thill coupling, it will of course be understood that the axle is provided with one of the couplings adjacent either end. In practice the thill iron 5 is inserted between the ears of the coupling and the bolt 6 is passed through the perforations in the ears and in the thill, thus coupling the two together. As will be seen the bolt is passed from the inner side outwardly until the shoulder 9 rests against the outer face of the inner ear 4, the slightly pointed end 8 of the bolt assisting in passing the same through said apertures.

Seated around the axle 2 adjacent the inner portion of the coupling 1 is a U-shaped clip 11' provided with threaded ends 12, said clip being secured in place by means of the base plate 13 which is provided with apertures through which the ends 12 of the clip 11 pass and are secured by nuts 14. This base plate 13 as shown is provided with a forwardly extending portion 15.

The upper downwardly extending portion of the clip member 11 is provided with forwardly extending, spaced apart ears 16 and 17 and pivotably secured between these ears by a bolt or other suitable means 18 is the arcuate shaped blade 19 provided upon its lower edge with the semi-circular recess 20. Connecting the free end of this blade with the end of the member 15 is a helical spring 21. As will be seen by referring to Figs. 1 and 2 of the drawings this clip is so positioned that the blade 19 rests across the upper portion of the bolt 6, intermediate between the shoulder 9 and the head portion thereof, the recess 20 being so positioned as to partially encircle the shank of the bolt. By this means the bolt is absolutely held against longitudinal movement, the spring 21 serving to maintain the engagement between the bolt and the blade irrespective of the jarring of the axle. The axle is further provided one upon either side of the center thereof, with a pair of U-shaped clips 22 each of which carries a forwardly extending arm 23 provided adjacent their ends with apertures similar to the apertures 11 in the heads of the bolts said apertures being in alinement with the bolts, and heavy helical springs 24 connect each of said arms with the adjacent bolt head, the springs being secured to said arms and heads by means of hooking the ends through the eyes formed therein.

As will be readily seen from the above description the raising of either of the blades will immediately release the bolt engaged thereby when the spring 24 will draw the bolt from the coupling, thus releasing the thill. This construction is extremely simple in operation and furnishes a ready means for detachably connecting the thills to the axle. In order to adapt this coupling for use as a horse detacher, I have provided the free end of each of the blades 19 with an aperture 25 by means of which the ends of the cords 26 and 27 may be firmly secured thereto, the free ends of said cords being united and joined to a cord which extends upwardly over the dasher of the wagon to a point within easy reach of the driver. If the horse becomes restive at any time, the driver need only exert a slight pull upon the cord 28 to raise both of the blades 19 out of engagement with the bolts when the latter will be withdrawn by the springs as previously described, thus releasing the shaft.

What I claim is:—

In a horse detacher, the combination with an axle having a thill coupling thereon and a thill for said coupling, of a bolt passed through said coupling and thill and provided with a shoulder, a clip secured to said axle, a blade member pivoted to said clip and engaging said bolt to normally retain the same in operative position, a second clip carried by said axle, a spring connecting said second clip with said bolt, said spring being adapted to withdraw said bolt upon the disengagement of said blade member therefrom, and means for disengaging said blade member.

In testimony whereof, I affix my signature, in presence of two witnesses.

HARRY W. FLOYD.

Witnesses:
 D. A. BARBER,
 B. P. STEPHENSON.